United States Patent Office 3,257,463
Patented June 21, 1966

3,257,463
1-ADAMANTANETHIOL
Franz Hafliger, Basel, Switzerland, assignor to Geigy Chemical Corporation, Ardsley, N.Y., a corporation of Delaware
No Drawing. Original application Mar. 7, 1963, Ser. No. 263,421. Divided and this application June 3, 1965, Ser. No. 475,908
Claims priority, application Switzerland, Mar. 9, 1962, 2,879/62
1 Claim. (Cl. 260—609)

This application is a division of S.N. 263,421, filed March 7, 1963.

This invention relates to new derivatives of 6-aminopencillanic acid which are useful as chemo-therapeutica, and to a process for producing the same.

Penicillins such as the naturally occurring penicillin G suffer from the drawbacks of being easily destroyed by acids such as hydrochloric acid in the gastric juices, and of being inactivated by penicillinase, an enzyme which is produced, for instance, by certain strains of gram-positive bacteria which thus become known as being "penicillin-G-resistant."

It is, therefore, an object of the invention to provide new derivatives of 6-amino-penicillanic acid which are sufficiently acid-resistant to permit oral application, and which are active also against the above-mentioned penicillin-resistant bacteria.

This and other objects of the invention are obtained by the compounds of the formula

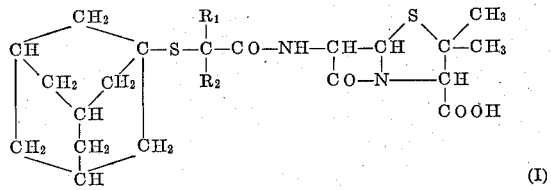

(I)

wherein
$R_1$ represents hydrogen, alkyl, preferably with from 1 to 5 carbon atoms, cycloalkyl, preferably with 5 to 6 carbon atoms, or mononuclear carbocyclic aryl, particularly phenyl, lower alkyl-phenyl, chlorophenyl, bromophenyl, lower alkoxyphenyl, cyanophenyl or such halogeno-lower alkylphenyl as, especially, trifluoromethylphenyl;
$R_2$ represents hydrogen or a lower alkyl radical;

and the salts of these compounds obtained by neutralization of the free acid of Formula I with inorganic and organic bases which possess an excellent antibacterial action against Gram-positive bacteria, low hygroscopicity and high heat resistance. Their antibacterial action also extends to strains of the aforesaid bacteria which are resistant to penicillin G.

"Lower" as used herein in connection with "alkyl" and the like radicals means "with 1 to 4 carbon atoms" unless stated otherwise.

The new compounds of Formula I are produced by a process according to the invention, which comprises:
(A) Reacting
(1) a reactive ester of a hydroxyl compound of the formula

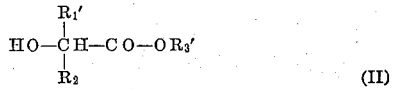

(II)

wherein
$R_1'$ represents hydrogen, an aliphatic, cycloaliphatic, aromatic or araliphatic radical,
$R_2$ represents hydrogen or a lower alkyl radical, and
$R_3'$ represents a lower alkyl radical, for example the bromide, the chloride, the lower alkane-, especially methane sulfonic acid ester or the p-toluene sulfonic acid ester of a compound of Formula II with heating preferably at 60° to 200° C. and advantageously with the exclusion of air, in a suitable inert organic solvent particularly diethylene glycol dimethyl ether; with
(2) A reactive salt of 1-adamantanethiol, in particular the alkali metal salts thereof, which may be formed in situ, or the silver, lead or mercury salts of 1-adamantanethiol, whereby the corresponding (α-adamant-1-ylthio)-carboxylic acid alkyl ester is obtained;

(B) Saponifying the latter compound, for example by moderate heating in an alkanolic alkali liquor, and then, if desired, isolating the free acid by acidification, for example with aqueous hydrochloric acid, thereby obtaining the corresponding free adamantylthio alkanoic acid of the formula

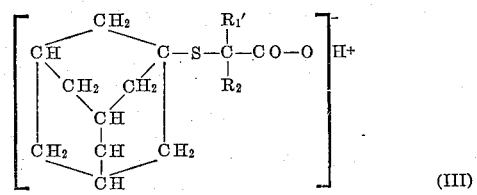

(III)

wherein $R_1'$ and $R_2$ have the meanings given hereinbefore; or, depending on the nature of the alkaline medium and the base used, the corresponding salt of said acid;

(C) Reacting the free acid of Formula III, if desired, with
(α) Thionyl chloride, phosphorus pentachloride or phosphorus oxychloride or -oxybromide at a temperature between room temperature (20° C.) and reflux temperature of the resulting mixture, depending on the stability of the acid involved, and, when necessary, a hydrocarbon solvent such as benzene, in order to produce the corresponding acyl chloride or bromide, or
(β) With acetic acid anhydride or thionyl chloride, with heating between 40° C. and reflux temperature of the mixture in order to produce either a mixed anhydride of the acid of Formula III and acetic acid or the anhydride of the acid of Formula III, or
(γ) With a chloroformic ester of the formula

Cl—CO—OR″ wherein R″ is lower alkyl, especially ethyl or isobutyl, or benzyl, p-nitro benzyl, allyl or methallyl, at about 0° C., thereby obtaining so-called "mixed anhydrides" of the acids of the Formula III which are carbonic acid esters of the formula

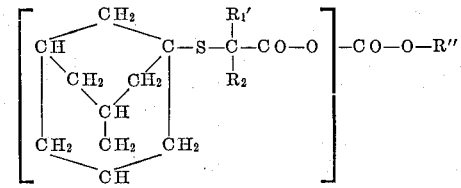

wherein $R_1'$, $R_2$ and R″ have the aforesaid meanings;

(D) Reacting the free acid of Formula III obtained in step (B), or one of the reaction products of step (C)(α), (β) or (γ) with 6-amino-penicillanic acid, namely, more in detail:
(1) Halides, anhydrides and mixed anhydrides at room temperature, or, if necessary with cooling to about 0° C. in the presence of acid-binding agents, in particular in the presence of sodium or potassium bicarbonate, -carbonate or -hydroxide in aqueous organic or inorganic medium, and tertiary organic bases such as triethylamine or pyridine in organic medium, for example in dioxan, tetrahydrofuran, acetone or chloroform;
(2) The free acids of Formula III above in the presence of water-binding agents, such as dicyclohexyl carbodiimide, diisopropyl carbodiimide and the like di-alkyl and di-cycloalkyl carbodiimides wherein alkyl and cycloalkyl have each about 3 to 6 carbon atoms, at the temperatures mentioned above under (D)(1);

(E) Isolating the reaction products from steps (D)(1), or (2) from the respective aqueous organic media, for example, by acidifying in the cold and extracting the 6-acylamino-penicillanic acid a water-immiscible organic solvent such as methylisobutylketone, ethyl acetate, n-amyl-acetate, or the like;

(F) Extracting the last-mentioned acid from said solvent, for example, with an aqueous sodium or potassium bicarbonate or carbonate solution, whereupon the resulting aqueous solution of the sodium or potassium salt of 6-acylamino-penicillanic acid can be evaporated in vacuo at low temperatures, or, preferably lyophilized.

When $R_1$ and $R_2$ in the Formula III have different meanings, the products are obtained as racemates which can be separated if desired into their antipodes in a conventional manner. Preferably, the separation is realized by reacting the racemic acids of the Formula III with optically active organic bases, for example, with (+) or (−)-α-phenyl-ethyl-amine in suitable solvents such as aqueous ethanol. The precipitated optically active salt is recrystallized and, if desired, the optically active acid is liberated, and then further reacted as described above.

For producing penicillin salts with organic bases, the latter can be reacted for example with the free acids in organic solvents or the alkali salts of the penicillins can be brought together in water with salts of the organic bases, for example the hydrochlorides, and the precipitated salts can be separated and dried.

The isolation of salts of 6-acylamino-penicillanic acid from organic reaction media can be carried out either directly by extraction with aqueous sodium or potassium bicarbonate solutions or by precipitation with organic bases.

The 1-adamantanethiol, which is used as starting material, is prepared for example by boiling the known 1-bromo-adamantane with thiourea in a mixture of glacial acetic acid and hydrobromic acid, followed by hydrolysis of the 1-adamantyl-isothiuronium bromide obtained, for example, by means of dilute caustic soda. The 1-adamantyl-isothiuronium bromide may furthermore be obtained for example by reacting the known 1-adamantanol with thiourea and hydrobromic acid.

In compounds of Formulae II and III, $R_1'$ is for example hydrogen, a methyl, ethyl, n-propyl, isopropyl, n-butyl, secondary butyl, isobutyl, tertiary butyl, n-amyl or isoamyl radical, an alkyl radical bridged by oxygen or sulfur, such as the β-ethoxyethyl or γ-methylthiopropyl radical, an alkenyl radical such as the allyl or methallyl radical, a cycloalkyl or cycloalkenyl radical such as the cyclopropyl, cyclobutyl, cyclopentyl, cyclohexyl, cycloheptyl, cyclo-hexyl-methyl, 2-5-endomethylene-cyclohexyl, cyclooctyl, 2,5-endomethylene-cyclohexyl-methyl, 1- or 2-cyclohexenyl or 2,5-endomethylene-3-cyclohexenyl radical, an aryl or substituted aryl radical such as the phenyl, p-tolyl, 3,4-dimethyl-phenyl p-isopropyl-phenyl, m- or p-fluoro-phenyl m- or p-chloro-phenyl, p-bromo-phenyl, m- or p-trifluoromethyl-phenyl, p-methoxy-phenyl, p-ethoxy-phenyl, p-isopropoxy-phenyl, 3,4-dimethoxy-phenyl, 3,4,5-trimethoxy-phenyl, 3,4-methylenedioxy-phenyl, m-nitro-phenyl, p-nitro-phenyl, p-methylsulfonyl-phenyl or β-naphthyl radical, an aralkyl or substituted aralkyl radical such as the benzyl, o- m- or p-methyl-benzyl, p-isopropyl-benzyl, p-fluoro-benzyl, p-chloro-benzyl, p-methoxy-benzyl, 3,4-dimethoxy-benzyl, 3,4,5-trimethoxy-benzyl, 3,4-methylenedioxy-benzyl, α-phenyl-ethyl, β-phenyl-ethyl or γ-phenyl-propyl radical, or an aryloxyalkyl or arylthioalkyl radical, which may be substituted, such as the β-phenoxy-ethyl or β-phenyl-thio-ethyl radical. $R_2$ is for example hydrogen or one of the above mentioned lower alkyl radicals and $R_3'$ in Formula II is for example one of the above mentioned alkyl radicals, in particular a methyl or ethyl radical.

Another method leading to the esters of the acid represented by Formula III consists in reacting compounds of the formula $$HS-\underset{\underset{R_2}{|}}{\overset{\overset{R_1'}{|}}{C}}-COOR_3' \qquad (IV)$$

wherein $R_1'$, $R_2$ and $R_3'$ have the significance indicated in the Formulae I and II, with reactive esters of 1-adamantanol in the presence of acid binding agents. The reaction may, for example, be carried out at temperatures between 100 and 180° in an excess of the reaction partner of the Formula IV or in an inert organic solvent.

The reactive 1-adamantanol esters should preferably be 1-bromo-adamantane, and also 1-chloro- or 1-iodo-adamantane, 1-adamantanol-p-toluene sulfonate, -methylsulfonate or -trifluoro-acetate.

An amount of a tertiary organic base, which is equivalent to the quantity of the reactive 1-adamantanol ester may serve as an acid-binding agent, preferably triethylamine, pyridine and collidine.

Salts of the free acid of Formula III obtained either directly from the alkaline phase (described in step (B)), or by neutralization of the free acid, or by exchange of cations of the said salts for those of another inorganic or organic base, are, for example, the sodium, potassium, lithium, ammonium, ethyl ammonium, triethyl ammonium, piperidinium, ethanol ammonium, diethanol ammonium, or N,N-diethylethanol ammonium salts or the corresponding magnesium, calcium or ethylenediammonium salts in which one equivalent weight of the latter cations is neutralized by two equivalent weights of the anion of the acid of Formula III.

These salts are starting intermediates for the next following steps, in that they can be isolated in a conventional manner and then used for preparing the free acid therefrom in a pure form, which can then be reintroduced into step (C) of the above-described process according to the invention.

Sodium, potassium, lithium, ammonium, magnesium or calcium salts, or salts of organic bases such as ethylamine, diethylamine, triethylamine, ethanolamine, diethanolamine, N-ethyl-diethanolamine, diethylaminoethanol, pyrrolidine, piperidine, N-ethyl-piperidine, 1-(β-hydroxy-ethyl)-piperidine, morpholine, procaine, benzylamine, dibenzylamine, 1-phenyl-propyl-(2)-amine and other amines, which are often used for producing penicillin salts, are salts of acids of the Formula I which may be produced in accordance with the invention.

The compounds according to the invention are stable against mineral acids; for instance, aqueous hydrochloric acid of pH 2, acting on these compounds for 3 to 10 hours at 20° to 25° C., decomposes less than 50% thereof.

The following non-limitative examples further illustrate the preparation of the new derivatives of 6-amino-penicillanic acid more in detail. The temperatures are given therein in degrees centigrade.

*Example 1*

(a) 107 grams (g.) (0.5 mol) of 1-bromo-adamantane are boiled for three hours under reflux with 76 g. (1 mol) of thiourea and 250 milliliters (ml.) of hydrobromic acid 48% in 500 ml. of glacial acetic acid. The hot reaction mixture is poured onto approximately 1800 g. of ice. The precipitated (1-adamantyl)-isothiuronium-bromide is separated on a suction filter and washed with water and then with methylene chloride. It is then shaken for approximately 14 hours at room temperature with 40 g. sodium hydroxide in 1000 ml. of water and 250 ml. of ethanol. The reaction product is separated on a suction filter, dissolved in benzene, the benzene solution is washed with water and the solvent evaporated. The 1-adamantanethiol, which remains behind as an oil, crystallizes upon trituration with pentane. It is then purified by means of sublimation at 110° under a pressure of 12 mm. Hg; the pure substance melts at 100–102°.

(b) A suspension of 6 g. (0.15 mol) of sodium amide in toluene (total volume 18 ml.) is added gradually to a solution of 16.8 g. (0.1 mol) of 1-adamantanethiol in 250 ml. of diethyleneglycol dimethylether at a bath temperature of 150° whilst being stirred in a nitrogen atmosphere, and the mixture is vigorously refluxed for three hours. 34 g.=24 ml. (0.2 mol) of α-bromoacetic acid ethylester is then added drop by drop for 30 minutes at the same temperature and boiled for approximately a further 14 hours. After cooling, the reaction mixture is poured onto about 1 kilogram of an ice-water mixture and then extracted with toluene. The toluene solution is washed several times with water, and the toluene is evaporated in a rotary evaporator at reduced pressure.

The oily residue which consists of ethyl α-(adamant-1-ylthio)-acetate is purified by means of distillation in high vacuum. At a pressure of 0.001 mm. Hg it distils over at 117–118°.

(c) In order to obtain the free acid, the oily crude ester, produced as described above is refluxed with 20 g. of sodium hydroxide in 400 ml. of ethanol for 5 hours. The ethanol is distilled off, the residue mixed with approximately 750 ml. of water and the aqueous phase is filtered through Hyflo. The filtrate is acidified with hydrochloric acid, the precipitated oil taken up in benzene-ether, the solution evaporated, the residue dissolved in 1000 ml. of 0.2 N aqueous sodium hydroxide solution, the solution is clarified with active carbon and filtered through Hyflo. On acidifying with hydrochloric acid, the α-(adamant-1-ylthio)-acetic acid initially precipitates in an oily form, but soon becomes solid. It is separated on a suction filter, washed to neutral with a large quantity of water and then dissolved in benzene. The benzene solution is dried with sodium sulfate. After evaporating the benzene solvent, α-(adamant-1-ylthio)-acetic acid remains as an oil and is crystallized from hexane/pentane. Melting point 68–70°.

(d) 1.05 g. of (adamant-1-ylthio)-acetic acid and 0.7 ml. of triethylamine are dissolved in 12 ml. of dioxan and 10 ml. of acetone and cooled to a temperature between 0° and 5°. 0.62 ml. of isobutyl chloroformate, dissolved in 5 ml. of dioxan, are added thereto drop by drop, the whole is stirred for 15 minutes at 0° and then separated from residual triethylaminehydrochloride by filtration. A solution of 1.16 g. of 6-aminopenicillanic acid (86.1%-pure) in 10 ml. of water and 1 ml. of triethylamine is added to the filtrate which is cooled to 0°. The reaction solution is stirred for 60 minutes at room temperature, a slight carbon dioxide development being constantly observed in the reaction solution. 10 ml. of water containing dissolved 1 g. sodium bicarbonate are then added and the whole is washed twice using 25 ml. of ether. The aqueous phase is covered with a layer of 20 ml. of methylisobutyl ketone and adjusted to pH 2.1 with 10 N sulfuric acid. After stirring the largest part of the reaction product passes over into the organic phase as free acid. The layers are separated and the aqueous phase is extracted once more using 5 ml. of methylisobutyl ketone each time. All methylisobutyl ketone extracts are combined, washed with 5 ml. of water and dried with sodium sulfate. The methyl isobutyl ketone solution is now shaken with a 3%-sodium bicarbonate solution until the aqueous phase has attained a pH of 6.8–7.0. The phases are separated and the organic phase is again shaken out with 5 ml. of water. The combined aqueous phases are washed with 25 ml. of ether and liberated from dissolved ether in a rotary evaporator. The clear and almost colorless solution of the resulting sodium salt of (adamant-1-ylthio)-methyl-penicillin is lyophilized.

There is obtained a white, voluminous powder, the antibiotic activity of which is determined in near accordance with the agar-incorporation test described by Florey et al. in "Antibiotics," published by Oxford University Press 1949, especially pages 201–203. In this test, a culture of microorganisms grown at 37° C. for 24 hours is transferred with the aid of a velvet-covered sterile stamper to a series of sterile agar plates containing the antibiotic to be tested in varying concentrations. The inoculated plates (sub-cultures) are then incubated at 37° C. for 24 hours. That concentration of the antibiotic at which growth of the respective bacterium is completely inhibited is called the "minimum inhibitory concentration."

The aforesaid final product inhibits the growth of *Staphylococcus aureous* NCTC 7447 in the above described agar incorporation test at a concentration of less than 0.01 microgram per milliliter ($\mu$g./ml.).

*Example 2*

(a) 36 g. (0.2 mol.) of α-bromo-propionic acid-ethylester are converted to the crude α-(adamant-1-ylthio)-propionic acid ethylester in the same manner as described in Example 1 under (b), and the crude α-(adamant-1-ylthio)-propionic acid-ethylester is boiled under reflux for approximately 14 hours with 16 g. of sodium hydroxide in 250 ml. of ethanol. The solid residue, which remains after the ethanol has been evaporated, is taken up in 250 ml. water, the resulting aqueous solution is extracted with methylene chloride, in order to remove the neutral components, it is then purified with charcoal, filtered and the filtrate acidified with concentrated hydrochloric acid. The resulting precipitate of α-(adamant-1-ylthio)-propionic acid is separated on a suction filter, recrystallized from cyclohexane and then from benzine, and then dried in high vacuum at 50° for 14 hours. Melting point 142–144°.

(b) 1.2 g. of α-(adamant-1-ylthio)-propionic acid (=8% excess calculated on 6-amino penicillanic acid) is dissolved in 5 ml. of thionyl chloride and boiled under reflux for 30 minutes. The excess thionyl chloride is evaporated in vacuo, the residue is dissolved in benzene and the latter solvent evaporated, leaving a residue which is dried in high vacuum (0.01 mm. Hg) for one hour and the resulting crude acid chloride is subsequently used without purification for the following reaction.

(c) 1.16 g. of 6-aminopenicillanic acid (86.1% pure) is dissolved in 25 ml. of water containing 3 g. of sodium bicarbonate, the solution is cooled to 0 to 5° in an ice bath, and the acid chloride produced under (b) supra, dissolved in 20 ml. acetone, is added thereto drop by drop with vigorous stirring. After the addition, which takes about 10 minutes, the ice bath is removed and the reaction mixture is stirred for 60 minutes at room temperature. The solution is now extracted with two times 10 ml. of ether and then covered with a layer of 20 ml. of methyl isobutyl ketone. The pH of the aqueous phase is adjusted to 2.1 by adding aqueous 10 N-sulfuric acid. The free acid of α-(adamant-1-ylthio)-ethyl penicillin passes over into the organic phase. The layers are separated and the aqueous phase is extracted once with 5 ml. of methylisobutyl ketone. The methyl isobutyl ketone solutions are combined and washed with 5 ml. of water. The sodium and the potassium salts of the α-(adamant-1-ylthio)-ethyl-penicillin [sodium, or potassium, 6-(2'-adamant - 1" - ylthio]-propionamido)-penicillanate] are obtained from the free acid in an analogous manner as described in Example 1, by extraction with aqueous sodium bicarbonate, or potassium bicarbonate solution, respectively.

Its activity is the same as that of the final product of the preceding example.

*Example 3*

In the same manner described as in Example 1, step (b), the crude α-(adamant-1-ylthio)-n-caproic acid ethylester is obtained by using 45 g. (0.2 mol.) α-bromocaproic acid ethylester instead of the ethyl α-bromoacetate used therein. The crude caproate is boiled under reflux for 6 hours with 20 g. of sodium hydroxide in 400 ml. of ethanol. After evaporation of the solvent, the residue is dissolved in 250 ml. of water and purified by filtration through Hyflo. The filtrate is acidified with hydrochloric acid, the precipitated oil taken up in toluene, and the toluene solution washed with water and the solvent evaporated. The resulting residue is then dissolved in cyclohexane, and this solution is thoroughly shaken several times with a saturated potassium bicarbonate solution until no more carbon dioxide is liberated. The cyclohexane solution is extracted with sodium carbonate solution, the solution obtained is filtered through Hyflo after the addition of charcoal, the filtrate is acidified with hydrochloric acid and the precipitated oil is taken up in ether-hexane.

The ether-hexane solvent is evaporated from the resulting solution and the residue is recrystallized from aqueous 80%-methanol at −5°. The crystals of α-(adamant-1-ylthio)-n-caproic acid are made into a paste with 50 ml. methanol 80% at −10°, the excess liquor is separated on a suction filter and the residue dried at 55° in high vacuum (0.001 mm. Hg). Melting point 74–76°.

The corresponding penicillin, namely α-(adamant-1-ylthio)-n-amyl-penicillin, is produced from α-(adamant-1-ylthio)-n-caproic acid in the same manner as described in Example 1, step d). It inhibits the growth of Staphylococcus aureus NCTC 7447 in the agar incorporation test at a concentration of 0.1 μg./ml.

*Example 4*

By using 39 g.=29.5 ml. (0.2 mol.) of α-bromo-butyric acid ethylester, instead of the corresponding ethyl bromoacetate of Example 1 and proceeding in the same manner as described in Example 1, step (b), the crude α-(adamant-1-ylthio)-butyric acid-ethylester is obtained. The latter is boiled under reflux for 5 hours with 16 g. sodium hydroxide in 250 ml. of ethanol, the ethanol solvent is distilled off, the residue dissolved in 500 ml. of water, the solution purified with charcoal and filtered through Hyflo. The filtrate is acidified with concentrated hydrochloric acid and extracted with benzene. The benzene solution is washed with water three times, dried with sodium sulfate and evaporated. The α-(adamant-1-ylthio)-butyric acid, which remains, is recrystallized from approximately 300 ml. of benzine and dried at a pressure of 12 mm. Hg. Melting point 113–114°.

valeric acid ethylester instead of ethyl bromo-acetates, and is boiled under reflux for 5 hours in 20 g. of sodium hydroxide in 300 ml. of ethanol. The ethanol is distilled off, the residue dissolved in 1000 ml. of water, the solution purified with charcoal, filtered through Hyflo and then acidified with concentrated hydrochloric acid. The α-(adamant-1-ylthio)-isovaleric acid precipitates initially as an oil, but soon solidifies. It is filtered off, pulverized, washed with water and then dissolved in benzene. The benzene solution is dried over anhydrous sodium sulfate and the solvent evaporated. The residue is decolorized with charcoal and recrystallized from 250 ml. of benzine and from 300 ml. of hexane and dried for 2 hours in high vacuum at 90° (0.001 mm. Hg). Melting point 134–135°.

(b) In exactly the same manner as described in Example 2, the acid chloride is produced from 1.4 g. of α-(adamant-1-ylthio)-isovaleric acid (=12% excess calculated on 6-amino-penicillanic acid). The well dried product has a melting point of 45–45.5°, after one crystallization from petrol ether.

(c) 1.16 g. of 6-aminopenicillanic acid 86.1% is suspended in 30 ml. of anhydrous chloroform and 2 ml. of triethyl amine and stirred for 30 minutes at room temperature. The solution is filtered and cooled to 0°. The aforesaid acid chloride, which is dissolved in 10 ml. chloroform, is added thereto drop by drop during 5 minutes and the reaction mixture is stirred for one hour at room temperature. The solvent is removed from the clear, pale yellow solution in a rotary evaporator (water bath temperature 25°) and the residue is taken up in 30 ml. of water and 50 ml. of methyl isobutyl ketone. The pH of the aqueous portion is adjusted to 2.1 with 10 N sulfuric acid and the phases are separated. The aqueous layer is extracted with 5 ml. of methyl isobutyl ketone. As is described in Example 2 the sodium salt of α-(adamant-1-ylthio)-isobutyl-penicillin is extracted by shaking with an aqueous 3%-sodium bicarbonate solution and the extract lyophilized. The product, an almost white amorphous powder, has a purity of 92% according to quantitative analysis data, and a minimum purity of 85% according to iodometric titration and pK determination. In the agar incorporation test it shows the following minimum inhibitory concentrations against Staphylococcus (R=highly resistant, r=weakly resistnat, s=sensitive to penicillin G):

| Staphylococcus strain | aureus Geigy 5001 R | aureus Geigy 5002 r | aureus Geigy 5003 R | aureus Geigy 5005 r | lactis NCTC 8340 s | aureus Smith s |
|---|---|---|---|---|---|---|
| Concentration in μg./ml | 1–10 | 1 | 10 | 1 | 0.1 | 0.1–1 |

In the agar cup diffusion test, the following inhibition zones (in mm.) result with 1 μg. of substance per cup:

| Staphylococcus strain | aureus Geigy 5001 R | aureus Geigy 5002 r | aureus Geigy 5003 R | aureus Geigy 5005 r | lactis NCTC 8340 s | aureus Smith s |
|---|---|---|---|---|---|---|
| Inhibition zones in mm | 22 | 24 | 21 | 24 | 42 | 33 |

α-(adamant-1-ylthio)-propyl-penicillin (sodium salt) is produced from α-(adamant-1-ylthio)-n-butyric acid in the manner indicated in Example 3. In the agar incorporation test, it inhibits the growth of Staphylococcus aureus NCTC 7447 at a concentration of 0.1 μg./ml.

*Example 5*

(a) In the same manner as in Example 1, step (b), the crude α-(adamant-1-ylthio)-isovaleric acid ethylester is prepared by using 42 g. (0.2 mol) α-bromo-iso- In the infra-red spectrum (potassium bromide) the substance shows bands at 3.45, 3.53, 5.65, 6.00, 6.22, 6.65, 6.90, 7.15, 7.60, 8.90, 9.60 and 10.25μ. The band at 5.65μ indicates the presence of a β-lactam ring.

It can be effectively dissolved in the following solvents: dimethyl-formamide, N,N-dimethylacetamide, methanol, ethanol, and other lower alcohols, methylene chloride, chloroform, tetrahydrofuran and pyridine; it is somewhat less soluble in glycerine, benzene, chlorobenzene, ethyl acetate, diethylene glycol diethyl ester, ethyl acetoacetate, acetone and dioxan; and is insoluble in ether, carbon tetrachloride and petroleum ether.

The optical rotation amounts to: $[\alpha]_D^{24°} + 151°$ (c.=1 in water). In the thin layer chromatogram (silica gel G buffered with 0.1 m. $NaH_2PO_4$) a single spot is shown in the system cyclohexane/ether/methanol 90:20:30. R value in relation to penicillin G (sodium salt)=1.64 (=$R_f$ value of the new penicillin derivative divided by $R_f$ value of penicillin G).

On replacing 1.4 g. of α-(adamant-1-ylthio)-isovaleric acid, which represents a racemate, by a corresponding amount of one of the two antipodes, the optically pure α-(adamant-1-ylthio)-isobutyl penicillins are obtained.

The antibacterial activity of the penicillin obtained from the positive rotating acid is remarkably higher than the activity of the diastereoisomer.

Example 6

The α-(adamant-1-ylthio)-isobutyric acid (from hexane) having a melting point of 141–142° is obtained, in exactly the same manner as described in the preceding Example 5, by using 39 g. (0.2 mol) of α-bromo-isobutyric acid-ethylester.

α-(adamant-1-ylthio)-isopropyl-penicillin, which inhibits the growth of *Staphylococcus aureus* NCTC 7447 at a concentration of 0.1 μg./ml., is obtained from α-(adamant-1-ylthio)-isobutyric acid (melting point 141–142°, from hexane).

Example 7

In the same manner, using α-bromo-β,β-dimethyl-butyric acid ethyl ester, the α-(adamant-1-ylthio)-β,β-dimethyl butyric acid is obtained. Recrystallized from benzine, it has a melting point of 207–208°.

The latter is then converted by a treatment analogous to that described in Example 1, step (d), to the α-(adamant-1-ylthio)-β,β-dimethyl-propyl-penicillin, of similar antibacterial activity as the penicillin derivatives described in the preceding examples.

Example 8

The crude α-(adamant-1-ylthio)-α-cyclopentyl-acetic acid-ethylester, which is obtained in the same manner as described in Example 1, step (b), by using 40 g. (0.17 mol) of α-bromo-α-cyclopentyl-acetic acid-ethylester, is refluxed for 6 hours with 20 g. of sodium hydroxide in 400 ml. of ethanol. The ethanol is filtered through Hyflo, buffered with carbon dioxide to pH 8 and filtered again with addition of charcoal. The filtrate is acidified to pH 6 using concentrated hydrochloric acid, the precipitate filtered and taken up in benzene-ether and the resulting solution extracted three times with 100 ml. of potassium carbonate solution, each time. The benzene-ether solution is evaporated and the residue is decolorized with charcoal and recrystallized twice from approximately 250 ml. hexane. The α-(adamant-1-ylthio)-α-cyclopentyl-acetic acid obtained in this manner has a melting point of 136–139°.

α-(adamant-1-ylthio)-α-cyclopentyl-acetic acid is then converted to [α-(adamant-1-ylthio)-α-cyclopentyl-methyl]-penicillin with a good degree of purity by the method described in Example 1, step (d). It inhibits the growth of *Staphylococcus aureus*, Geigy 5001 and Geigy 5003 strains (both highly resistant to penicillin G), at a concentration of 10 μg./ml., or less.

Example 9

The N-ethyl-piperidinium-salt of α-(adamant-1-ylthio)-isobutyl penicillin is obtained for example in the following manner:

300 mg. of the sodium salt of α-(adamant-1-ylthio)-isobutyl penicillin is dissolved in 10 ml. of water and covered with a layer of 40 ml. of ether. The whole is cooled in an ice bath and the aqueous solution is acidified with stirring (pH 2.1). The layers are separated and the aqueous layer is extracted with 5 ml. of ether. The combined ether extracts are washed twice using 3 ml. of water each time and dried with sodium sulfate. The solution is cooled to −15° to −20° and a solution of 70 mg. of N-ethyl-piperidine in 3 ml. of ether is added slowly. The N-ethyl-piperidinium salt, precipitating in fine droplets, is liberated by means of centrifuging from the mother liquor and is dissolved in 5 ml. of dioxan. The dioxan is removed in high vacuum at a low temperature, a white hygroscopic powder remaining. In in vitro tests, it shows the same activity as the corresponding sodium salt (see Example 5).

Example 10

The 1-phenyl-propyl-(2)-ammonium salt of α-(adamant-1-ylthio)-isobutyl-penicillin is easily obtained in pure form in the following manner:

300 mg. of the sodium salt of α-(adamant-1-ylthio)-isobutyl penicillin are dissolved in 3 ml. of water and cooled in an ice bath. A solution of 105 mg. of 1-phenyl-propyl-(2)-amine hydrochloride in 3 ml. of water is added drop by drop. The flaky, white precipitate, which forms immediately, is recovered by means of centrifuging or by rapid filtration under suction. It is dissolved in absolute benzene and the solution is lyophilized. The white powder, which forms in an almost quantitive yield, is sparingly soluble in water, but easily soluble in organic solvents. It has the same effect (in in vitro tests) against Staphylococci as the corresponding sodium salt (see Example 5).

Example 11

When 34 g. (1.2 mol) of 1-adamantanethiol in 500 ml. of warm 95% ethanol are added to a mixture of 38 g. (0.1 mol) of lead acetate $(CH_3COO)_2Pb \cdot 3H_2O$ in 500 ml. of the same solvent, the yellow lead salt precipitates. After cooling to 0° it is filtered off and washed with ethanol. After drying the precipitate at 50° in high vacuum the yield of lead salt is 52 g. 34 g. (0.063 mol) of this salt and 38 g. (0.156 mol) of α-bromo-phenyl-acetic acid ethyl ester in 750 ml. of absolute dioxane are refluxed for 60 hours. After cooling and filtration the filtrate is evaporated, the residue treated with hexane and separated from insoluble sludge by filtration. The filtrate is concentrated and the remaining bromoester is distilled off in high vacuum. The distillation residue (22 g.) is refluxed for 16 hours with 100 ml. of ethanol and 5 g. of sodium hydroxide. The ethanol is evaporated and the residue is treated with 500 ml. of water. The aqueous phase is filtered through charcoal. The filtrate is acidified with hydrochloric acid. The viscous precipitate is extracted with ether/benzene and evaporated. After extraction of the residue with diluted sodium bicarbonate solution and purification with charcoal, acid is added. The resulting precipitate is recrystallized from cyclohexane/hexane to give the α-(adamant-1-ylthio)-phenylacetic acid. Melting point 122–124°.

α - (adamant - 1 - ylthio) - phenyl - methyl - penicillin which is obtained from α-(adamant-1-ylthio)-phenyl acetic acid as described in the preceding example, inhibits at a concentration of 0.1 μg./ml. the growth of *Staphylococcus aureus* NCTC 7447.

Similar results can be obtained by using one of the two enantiomeric acids instead of the racemate mentioned above.

Example 12.—Separation of a racemic acid 26.8 g. of α-(adamant-1-ylthio)-isovaleric acid (obtained according to Example 5) and afterwards 12.1 g. of (+)-α-phenyl-ethyl-amine (an excess of 0.5 g.) are dissolved in 250 ml. of 50% ethanol while stirring and heating. Then the solution is left to stand in an ice bath. The precipitated salt is filtered off with suction and recrystallized three times from 50% ethanol (200 ml. 150 ml. 100 ml., respectively). Thereupon the optical rotation of the salt is $[\alpha]_D^{25}+35.8$ (c.=2.003 in ethanol).

To liberate the acid the three times recrystallized salt is dissolved in 50 ml. of ethanol, the solution is acidified with 2 N hydrochloric acid and thereupon 200 ml. of water are added. The precipitated acid is filtered off with suction, washed and dried. After recrystallization from 35 ml. of hexane, the optical rotation of the resulting (+)-α-(adamant-1-ylthio)-isovaleric acid is $[\alpha]_D^{24} +39.6°$ (c.=1.995 in ethanol).

The combined mother liquors of the four recrystallizations are acidified with concentrated hydrochloric acid and diluted with water to double the volume. The precipitated acid is filtered off with suction, washed with water and dried. The acid and afterwards 10.4 g. of (−)-α-phenyl-ethyl-amine are dissolved in 50% ethanol while heating and stirring. Then the solution is left to stand in an ice bath. The precipitated salt is recrystallized twice from 50% ethanol (150 ml.; 100 ml., respectively), $[\alpha]_D^{24}-33.3°$ (c.=2.008 in ethanol). The twice recrystallized salt is dissolved in 50 ml. of ethanol, the solution is acidified with 2 N hydrochloric acid and diluted with 200 ml. of water. The precipitated acid is filtered off by suction, washed and dried. After recrystallization from 35 ml. of hexane, the optical rotation of the resulting (−)-α-(adamant-1-ylthio)-isovaleric acid is $[\alpha]_D^{24}-35.6°$ (c.=2.001 in ethanol).

On acidifying the combined mother liquors from the above mentioned three recrystallizations with 10 ml. of concentrated hydrochloric acid, diluting with water to double the volume and filtering with suction racemic acid can be recovered.

*Example 13*

16.0 g. (0.075 mol) of 1-bromo-adamantane, 80 ml. of 2-mercaptoethanoic acid ethyl ester and 10 ml. of collidine are boiled for 15 hours in a nitrogen atmosphere. After cooling the reaction mixture is diluted with 300 ml. of diethylether and is poured on 300 ml. of ice-water. After addition of 100 ml. of concentrated aqueous sodium hydroxide solution the excess of 2-mercaptoethanoic acid ethyl ester is to be found in the aqueous phase. After filtration through Hyflo the aqueous solution is evaporated, the organic phase is washed twice with diluted sodium hydroxide solution and is dried with magnesium-sulfate. The ether is evaporated and the resulting dark oil (26 g.) is refluxed for 12 hours together with 25 g. of sodium hydroxide in 300 ml. of ethanol. After evaporation of the ethanol the residue is dissolved in 500 ml. of water, clarified with charcoal and Hyflo, acidified and extracted with benzene. After evaporation, dissolving the residue in sodium bicarbonate solution, clarification with charcoal and Hyflo, acidifying and extraction with ether and after drying and evaporation of the ether 8 g. of oil are obtained which can be recrystallized from hexane and acetone. The yield amounts to 4 g. (25%); melting point and mixed melting point 69–71°.

The IR-spectra of the acids produced according to both methods are identical (compare Example 1).

The following penicillin derivatives according to the invention are prepared from the corresponding starting materials in an analogous manner to the procedure of Example 11:

Example:
14. α-(adamant - 1 - ylthio) - 4' - methyl - phenyl-methyl - penicillin.
15. α - (adamant - 1 - ylthio) - 4' - chloro - phenyl-methyl-penicillin.
16. α - (adamant - 1 - ylthio) - 4' - bromo - phenyl-methyl-penicillin.
17. α - (adamant - 1 - ylthio) - 2' - methoxy - phenyl-methyl-penicillin.
18. α - (adamant - 1 - ylthio) - 4' - trifluoromethyl-phenyl-methyl-penicillin.
19. α - (adamant - 1 - ylthio) - 3',5' - dimethyl-phenyl-methyl-penicillin.

I claim:
1-adamantanethiol.

No references cited.

CHARLES B. PARKER, *Primary Examiner.*
DELBERT R. PHILLIPS, *Assistant Examiner.*